(12) United States Patent
Fujan et al.

(10) Patent No.: US 9,796,211 B2
(45) Date of Patent: Oct. 24, 2017

(54) ADAPTER FOR MOUNTING LARGER DIAMETER RIMS

(71) Applicant: Caterpillar Global Mining LLC, Oak Creek, WI (US)

(72) Inventors: Steven J. Fujan, Tulsa, OK (US); Matthew J. Orvedahl, Racine, WI (US); Frederick W. Loeber, Oak Creek, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 214 days.

(21) Appl. No.: 14/648,877

(22) PCT Filed: Dec. 4, 2012

(86) PCT No.: PCT/US2012/067746
§ 371 (c)(1),
(2) Date: Jun. 1, 2015

(87) PCT Pub. No.: WO2014/088553
PCT Pub. Date: Jun. 12, 2014

(65) Prior Publication Data

US 2015/0352895 A1    Dec. 10, 2015

(51) Int. Cl.
*B60B 11/04* (2006.01)
*B60B 23/08* (2006.01)
(Continued)

(52) U.S. Cl.
CPC .............. *B60B 11/04* (2013.01); *B60B 11/06* (2013.01); *B60B 23/08* (2013.01); *B60B 23/10* (2013.01);
(Continued)

(58) Field of Classification Search
CPC ......... B60B 11/04; B60B 23/08; B60B 11/06; B60B 23/10; B60B 25/045; B60B 25/18; B60B 2900/351; B60Y 2200/142
(Continued)

(56) References Cited

U.S. PATENT DOCUMENTS 1,297,243 A    3/1919  Putnam
1,982,057 A *  11/1934 Jobski ..................... B60B 11/06
                                                          301/10.1
(Continued)

FOREIGN PATENT DOCUMENTS

WO    2011151644    12/2011

OTHER PUBLICATIONS

International Search Report mailed Jun. 10, 2013, in Application No. PCT/US2012/067746 by the Korean Intellectual Property Office (2 pages).
(Continued)

*Primary Examiner* — S. Joseph Morano
*Assistant Examiner* — Jean Charleston

(57) ABSTRACT

A dual wheel adapter assembly for mounting dual wheel rims to a wheel hub is provided. The dual wheel adapter assembly may include a hollow cylindrical adapter, including a central bore defined by an inner surface of the adapter, a first contact surface, and a second contact surface. The dual wheel adapter assembly may also include an inboard wheel rim configured to support a tire, an outboard wheel rim configured to support a tire, and a wedge clamp configured to be coupled to the hub. The first contact surface may abut the hub and the wedge clamp may apply a compressive force to the second contact surface to couple the adapter to the hub.

9 Claims, 9 Drawing Sheets

(51) Int. Cl.
*B60B 11/06* (2006.01)
*B60B 23/10* (2006.01)
*B60B 25/04* (2006.01)
*B60B 25/08* (2006.01)
*B60B 25/18* (2006.01)

(52) U.S. Cl.
CPC ............ *B60B 25/045* (2013.01); *B60B 25/08* (2013.01); *B60B 25/18* (2013.01); *B60B 2900/351* (2013.01); *B60Y 2200/142* (2013.01)

(58) Field of Classification Search
USPC ...... 301/126, 137, 105.1, 35.628, 10.1, 11.1, 301/13.2, 36.1
See application file for complete search history.

(56) References Cited

U.S. PATENT DOCUMENTS

| | | | | |
|---|---|---|---|---|
| 2,719,559 | A | * | 10/1955 | Smith ................ B60B 11/06 152/220 |
| 3,039,825 | A | * | 6/1962 | Clark ................ B60B 11/06 301/36.1 |
| 3,146,031 | A | | 8/1964 | Walther |
| 3,623,772 | A | | 11/1971 | Walther |
| 3,837,709 | A | | 9/1974 | Williamson |
| 3,847,442 | A | | 11/1974 | Masser |
| 3,913,981 | A | * | 10/1975 | Hunden ............... B60B 11/04 29/894.32 |
| 4,049,320 | A | | 9/1977 | DeRegnaucourt et al. |
| 4,371,213 | A | | 2/1983 | Walther |
| 4,586,376 | A | * | 5/1986 | Outmans ............... E21B 49/00 73/38 |
| 4,743,070 | A | | 5/1988 | Henke et al. |
| 4,902,074 | A | | 2/1990 | DeRegnaucourt et al. |
| 5,083,597 | A | | 1/1992 | France |
| 6,568,764 | B2 | | 5/2003 | McNeil et al. |
| 8,690,265 | B2 | * | 4/2014 | Noblanc ............... B60B 11/02 301/36.1 |
| 2002/0149256 | A1 | | 10/2002 | McNeil et al. |
| 2003/0010564 | A1 | * | 1/2003 | Hinton ................ B60K 17/046 180/363 |
| 2007/0267914 | A1 | | 11/2007 | Verdun et al. |
| 2010/0194180 | A1 | | 8/2010 | Gibson |
| 2010/0247843 | A1 | | 9/2010 | Yoshida et al. |
| 2012/0231915 | A1 | * | 9/2012 | Vallejo .................. B60B 11/02 475/149 |
| 2012/0247843 | A1 | | 10/2012 | Oriet |
| 2012/0292979 | A1 | | 11/2012 | Noblanc et al. |
| 2013/0140875 | A1 | * | 6/2013 | Cragg .................. B60B 11/00 301/36.1 |

OTHER PUBLICATIONS

International Preliminary Report on Patentability and Written Opinion dated Jun. 9, 2015, in PCT/US2012/067746 (6 pages).

* cited by examiner

ADAPTER FOR MOUNTING LARGER DIAMETER RIMS

CLAIM FOR PRIORITY

This application is a U.S. National Phase entry under 35 U.S.C. §371 from PCT International Application No. PCT/US2012/067746, filed Dec. 4, 2012, which is incorporated herein by reference.

TECHNICAL FIELD

The present disclosure relates generally to the field of dual wheel assemblies. More specifically the disclosure relates to an improved dual wheel assembly that allows dual wheels of different rim diameters to be mounted to a hub.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Vehicles, such as heavy duty mining trucks may have dual wheel systems including multiple wheels coupled to a common hub. Such trucks are utilized to haul bulk material, such as earth, coal, ore, etc. On a fully loaded truck, this payload may represent a very heavy load, that can reach over 400 tons on some trucks. Dual-wheel systems increase the surface area between the vehicle and the ground, which allows additional power to be utilized to propel the vehicle and distributes the weight of the vehicle and any payload over additional wheels.

In some scenarios, a dual wheel system may be refitted with new tires that require larger diameter rims than the original, smaller tires. For example, if the smaller diameter tires become harder to buy on the market and if the larger diameter tires are readily available, it may be desirable to refit the vehicle with larger diameter tires. By providing the ability to fit larger diameter tires, the vehicle is able to continue in productive service instead of sitting idle.

Typically, larger diameter tires are fitted to smaller diameter hubs with rims having a thick mounting flange portion extending from the tire to the hub, sometimes known as a "stilted rim". The stilted rims may utilize a standard wheel clamp and spacer band between the rims. However, compared to a standard rim for use with a smaller diameter tire, a stilted rim results in an increased loading on the studs coupling the rims to the hub and an increased applied moment on the rim, which may be excessive depending on loading of the vehicle and its intended use.

SUMMARY

An embodiment of the present disclosure relates to a dual wheel adapter assembly for mounting dual wheel rims to a wheel hub. The dual wheel adapter assembly includes a hollow cylindrical adapter. The hollow cylindrical adapter includes a central bore defined by an inner surface of the adapter, a first contact surface, and a second contact surface.

The dual wheel adapter assembly also includes an inboard wheel rim configured to support a tire, the inboard wheel rim coupled to the adapter. The dual wheel adapter assembly further includes an outboard wheel rim configured to support a tire, the outboard wheel rim coupled to the adapter. Lastly, the dual wheel adapter assembly includes a wedge clamp configured to be coupled to the hub. In this embodiment, the first contact surface abuts the hub and the wedge clamp applies a compressive force to the second contact surface to couple the adapter to the hub.

Another embodiment of the present disclosure relates to a dual wheel mounting system for a wheel hub. The dual wheel mounting assembly system includes an adapter configured to be coupled to a wheel hub, the adapter comprising a first annular end face and a second annular end face. The dual wheel mounting assembly system also includes an inboard wheel rim configured to support a tire, the inboard wheel rim comprising an inwardly extending annular bolt flange. The dual wheel mounting assembly further includes an outboard wheel rim configured to support a tire, the outboard wheel rim comprising an inwardly extending annular bolt flange. The bolt flange of the inboard wheel rim is coupled to the first annular end face of the adapter and bolt flange of the outboard wheel rim is coupled to the second annular end face of the adapter.

Still another embodiment of the present disclosure relates to a dual wheel adapter for mounting dual wheel rims to a wheel hub. The dual wheel adapter includes a hollow cylindrical adapter. The hollow cylindrical adapter includes a central bore defined by an inner surface of the adapter, a first angled contact surface configured to engage the wheel hub, and a second angled contact surface configured to engage a clamp. The hollow cylindrical adapter also includes a first annular end face and a second annular end face, the first annular end face configured to connect to an inboard wheel rim and the second annular end face configured to connect to an outboard wheel rim.

It is to be understood that both the foregoing general description and the following detailed description are exemplary and explanatory only, and are not restrictive of the disclosure as claimed.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
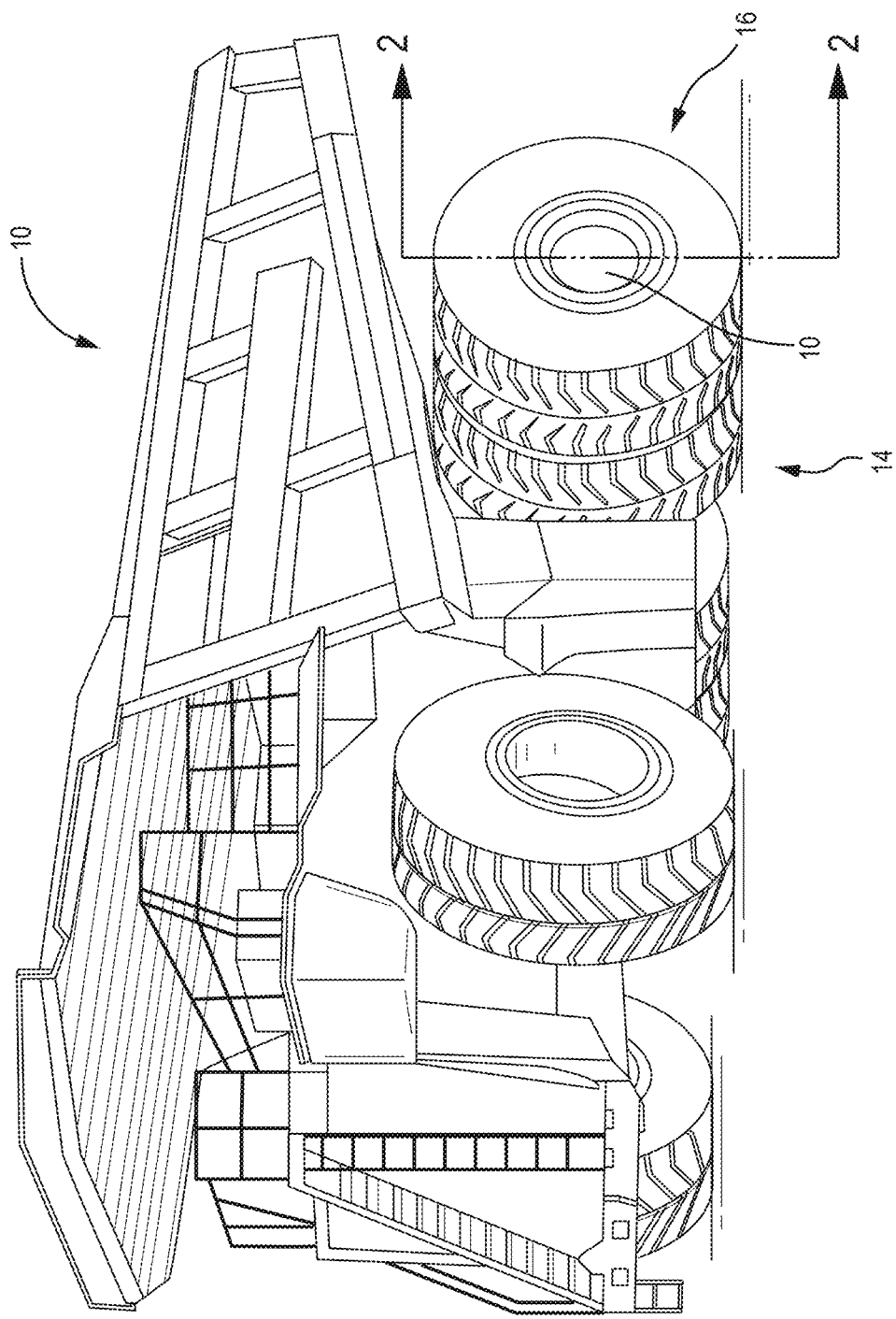
FIG. 1 is a perspective view of a vehicle shown as a mining truck that may utilize a dual wheel adapter, in accordance with an exemplary embodiment.

Referring to FIG. 1, a vehicle 10 is shown according to one exemplary embodiment as a heavy duty mining truck. Vehicles 10 such as mining trucks may include dual-wheel systems to support a large load. The vehicle 10 may typically powered by an on-board internal combustion engine and one or more rotating hubs to which the wheels are coupled. With smaller vehicles, the hubs may be directly coupled to the engine via mechanical components, such as a drive shaft and a differential. However, with larger vehicles, such as the mining truck shown in FIG. 1, the engine may drive a generator, which then provides electrical power to hub motors 12. The wheels are then coupled to the hub motors 12. In an exemplary embodiment, the vehicle 10 includes two rear hub motors 12 with a dual wheel system including an inboard wheel 14 and an outboard wheel 16 coupled to each of the hub motors 12.

Figure 2:
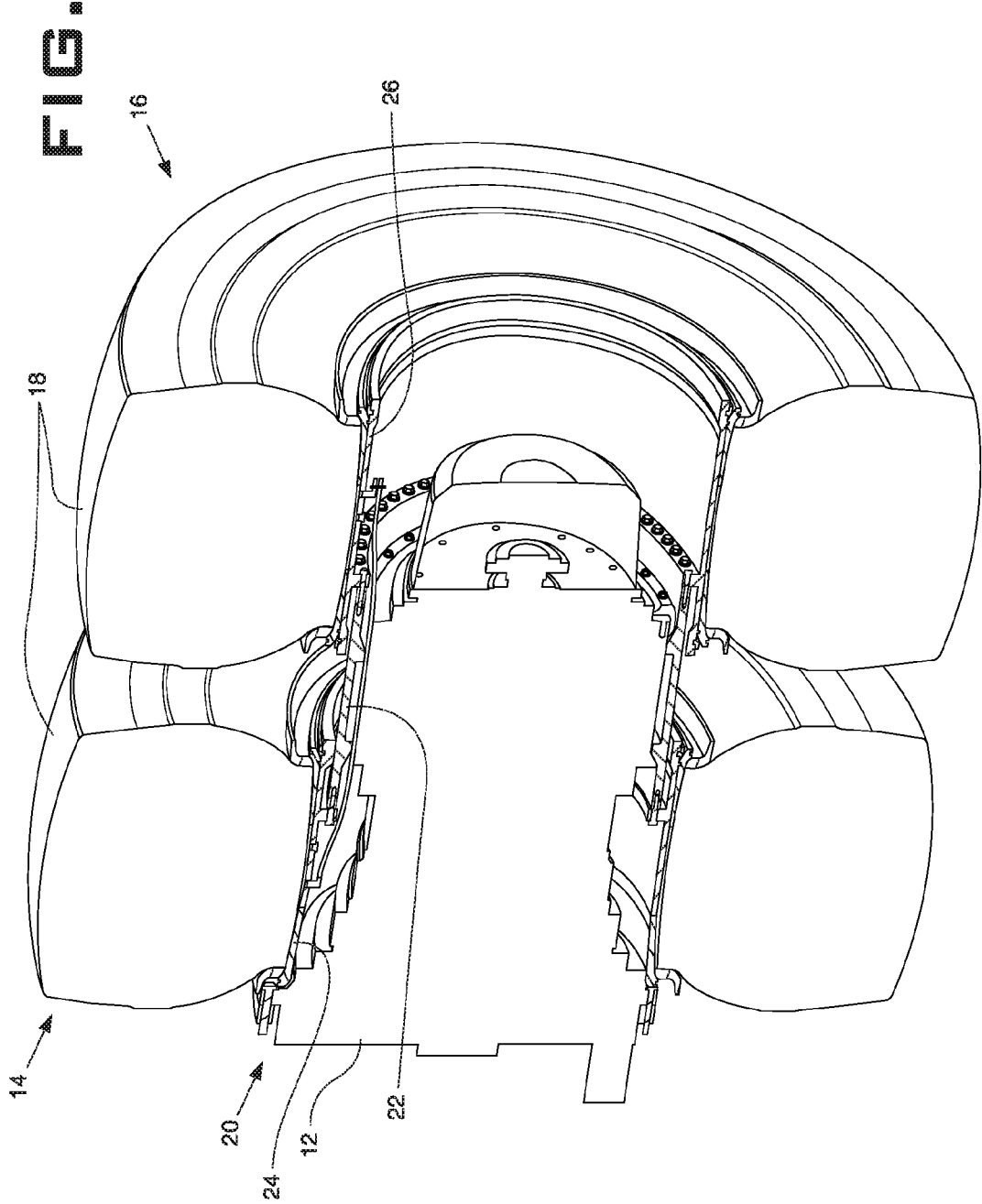
FIG. 2 is an isometric cross-section view of a rear dual wheel adapter for the vehicle of FIG. 1 taken along line 2-2, in accordance with an exemplary embodiment.
Figure 3:
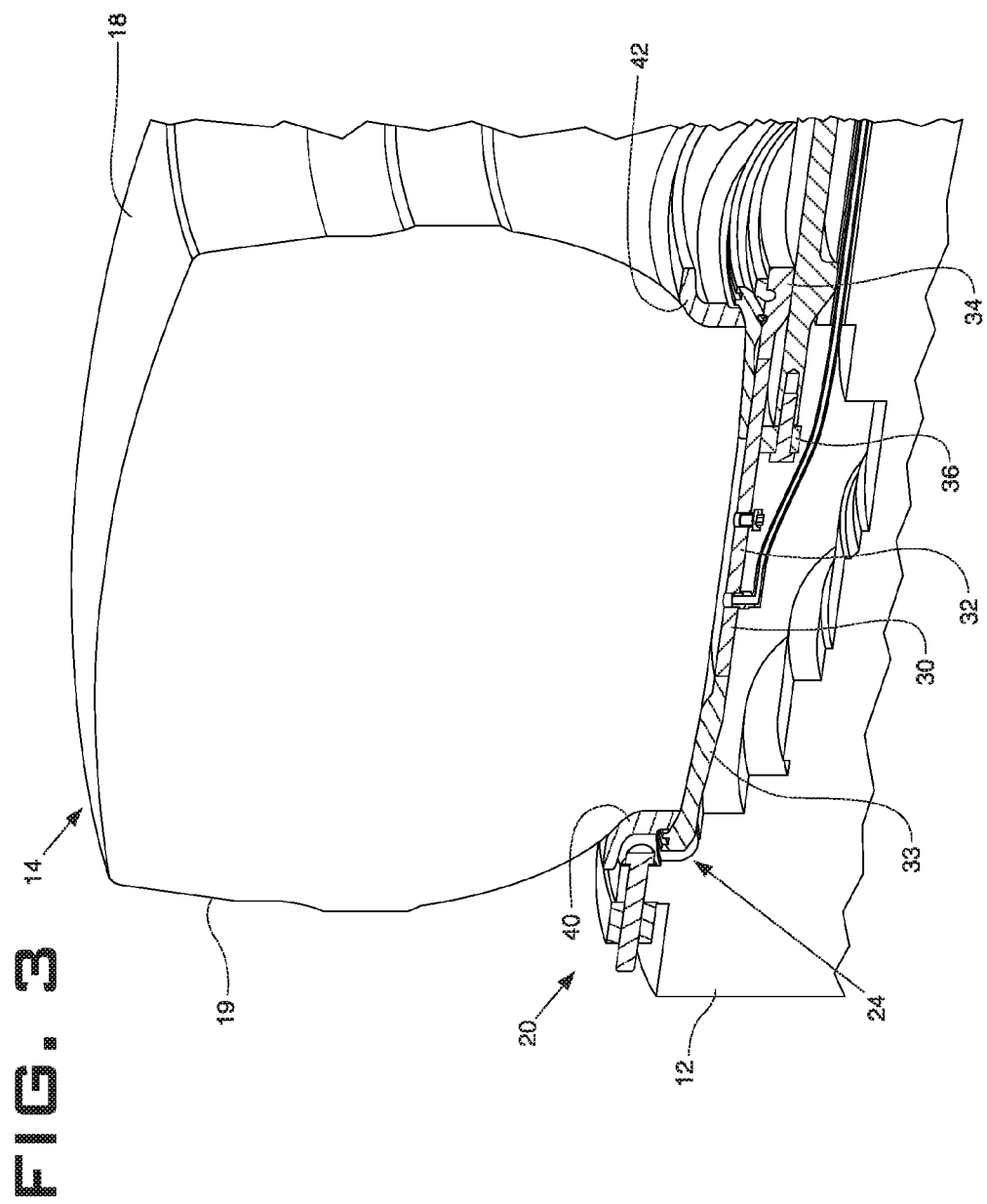
FIG. 3 is a more detailed view of a portion of the isometric cross-section view of a rear dual wheel adapter shown in FIG. 2, in accordance with an exemplary embodiment.
Figure 4:
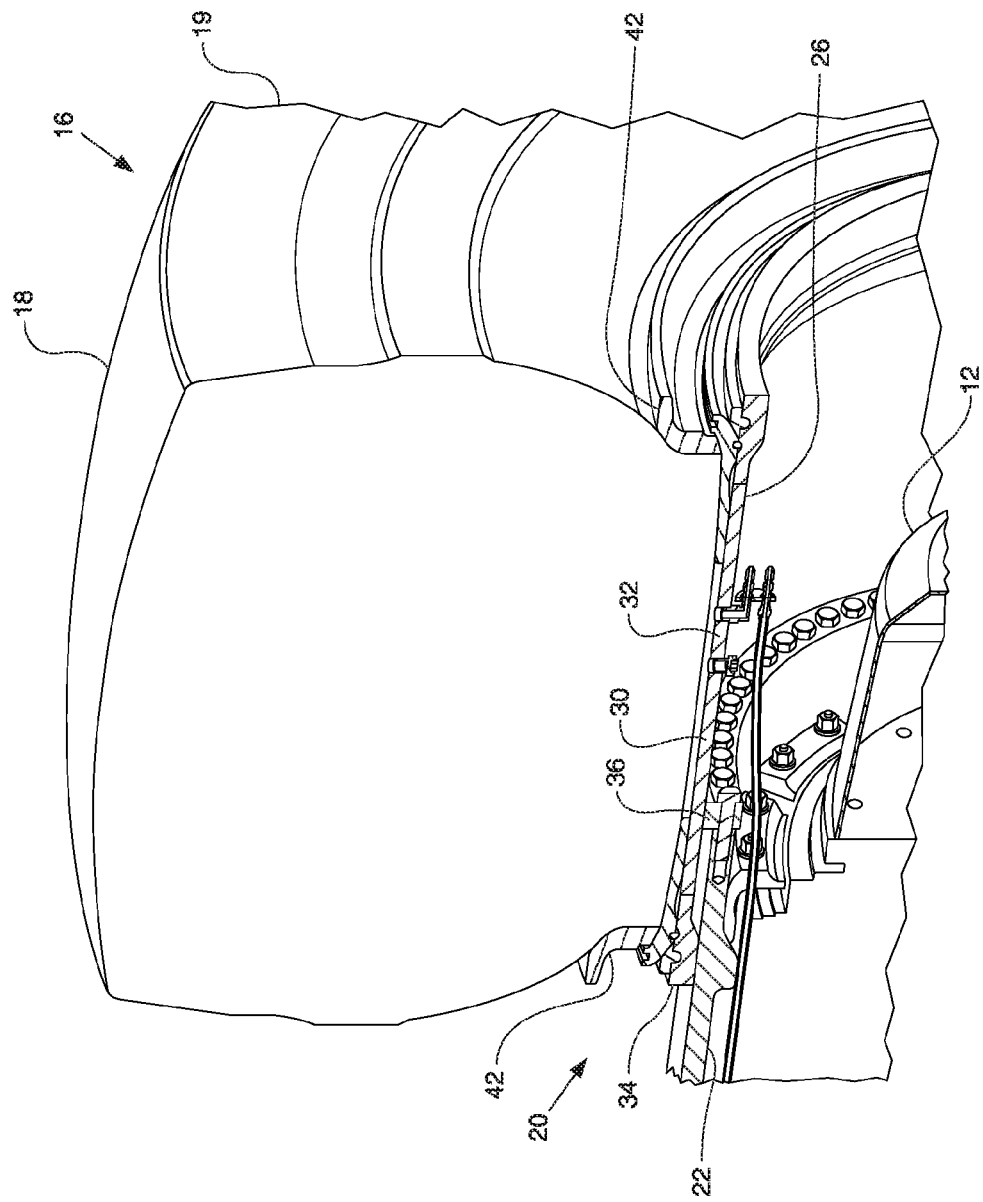
FIG. 4 is a more detailed view of another portion of the isometric cross-section view of a rear dual wheel adapter shown in FIG. 2, in accordance with an exemplary embodiment.

Referring now to FIGS. 2-4, in an exemplary embodiment, the inboard wheel 14 and the outboard wheel 16 are coupled to the hub 12 with an adapter assembly 20. The inboard wheel 14 and the outboard wheel 16 each include a tire 18. The adapter assembly 20 is configured to allow wheels 14 and 16 of an increased size (e.g., an increased rim diameter, an increased tire diameter, an increased tire width, etc.) to be coupled to the hub 12 at a proper location to avoid crowning of the tires 18 or contact between the tires 18 when the vehicle 10 is loaded. The adapter assembly 20 includes an adapter 22 that is coupled to the hub 12, an inboard rim 24 supporting the inboard tire 18 and configured to be coupled to the adapter 22, and an outboard rim 26 supporting the outboard tire 18 and configured to be coupled to the adapter 22.

Figure 5:
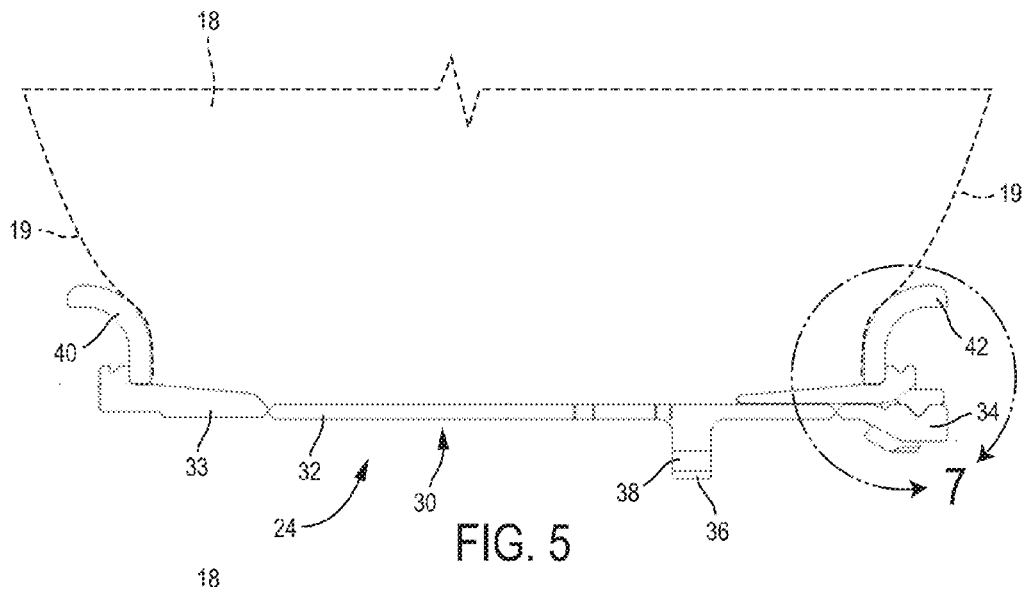
FIG. 5 is a cross-section view of an inboard tire rim for the dual wheel adapter of FIG. 4.

Referring now to FIGS. 3 and 5, the inboard rim 24 is shown according to an exemplary embodiment. The inboard rim 24 includes a cylindrical base 30 to which is coupled a pair of opposing tire bead flanges 40, 42 configured to support the bead and the sidewalls 19 of the tire 18. The base 30 may be formed of two or more generally cylindrical members coupled together (e.g. with a weld, mechanical fasteners, etc.). For example, as shown in FIG. 3, the base 30 may be formed of a first or main portion 32, an extension 33, and a gutter 34. The base 30 further includes an inwardly extending flange 36. The inwardly extending flange 36 facilitates the coupling of the inboard rim 24 to the adapter 22 with a number of fasteners (e.g., bolts) received in apertures 38 in the flange 36. The gutter 34 may include a groove 35 for a resilient sealing member such as an o-ring.

Referring further to FIGS. 3 and 5, the tire bead flanges may be permanently coupled to the base 30 (e.g., flange 40) or may be removable from the base 30 (e.g., removable flange 42). The permanent flange 40 may be coupled to the base 30 with a suitable coupling method, such as welding. In another exemplary embodiment, the permanent flange 40 may be integrally formed with the base 30. The removable flange 42 may be separated from the base 30 to facilitate the removal of the tire 18 from the inboard rim 24 and may be coupled to the base 30 utilizing a bead seat band 44 and a lock ring 50.

Figure 7:
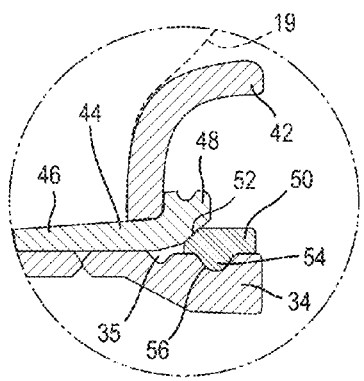
FIG. 7 is a detail cross-section view of a removable rim flange for the inboard tire rim of FIG. 5.

Referring more particularly to FIG. 7, the bead seat band 44 includes a base portion 46 with a wedge-shaped cross-section that is inserted under the removable flange 42, between the removable flange 42 and the base 30 such that the base portion 46 at least partially supports the bead of the tire 18. The o-ring in the groove 35 is compressed between the bead seat band 44 and the gutter 34. The bead seat band 44 further includes a side wall 48 that applies a lateral force on the removable flange 42 to retain the removable flange 42 on the base 30 and resist the outward force applied to the removable flange 42 by the sidewall 19. The bead seat band 44 is retained through contact with the lock ring 50 along a contact surface 52. The lock ring 50, in turn, is coupled to the base 30 through a ridge 54 that is received in a lock ring groove 56 in the gutter 34. The lock ring 50 may be a continuous circular member that extends about the circumference of the base 30. In another embodiment, the removable flange 42 and the bead seat band 44 may be retained by a multitude of locking members disposed about the circumference of the base 30.

Figure 6:
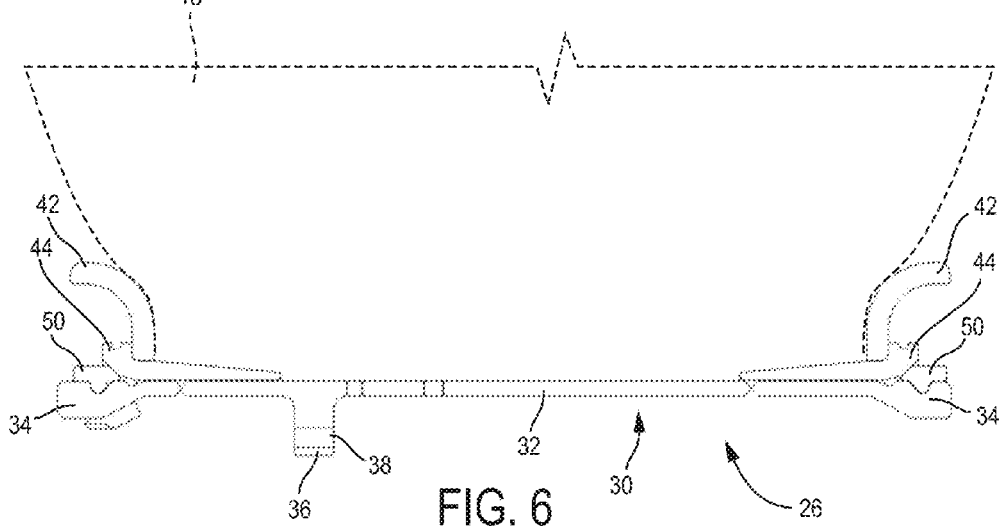
FIG. 6 is a cross-section view of an outboard tire rim for the dual wheel adapter of FIG. 5.

Referring now more particularly to FIGS. 4 and 6, the outboard rim 26 is shown according to an exemplary embodiment. The outboard rim 26 is similar in construction to the inboard rim 24 and includes a cylindrical base 30 which is shown coupled to a pair of opposing, removable tire bead flanges 42 configured to support the bead and the sidewalls 19 of the tire 18. Unlike the inboard rim 24, the base 30 of the outboard rim 26 has a double gutter construction with main portion 32 and two gutters 34 coupled to the main portion 32. The base 30 further includes an inwardly extending flange 36. The inwardly extending flange 36 facilitates the coupling of the outboard rim 26 to the adapter 22 with a number of fasteners (e.g., bolts) received in apertures 38 in the flange 36. Because the base 30 is formed from multiple components, common components may be utilized for different configurations. For example, the base 30 for both the inboard rim 24 and the outboard rim 26 may include common main portions 32 and gutters 34.

The double gutter configuration allows the outboard rim 26 to include removable flanges 42 coupled to either end of the base 30 with the associated bead seat bands 44 and lock rings 50 as described above. The tire 18 may be removed from the outboard rim 26 by removing the outboard removable flange 42 (e.g., the rightmost flange 42 as shown in FIG. 3). The double gutter configuration of the outboard rim 26 allows the tire 18 to be removed from the inboard rim 24 without removing the adapter assembly 20 from the hub 12. Instead, both removable flanges 42 (along with the associated bead seat bands 44 and lock rings 50) and the tire 18 are removed from the outboard rim 26 and the removable flange 42 is removed from the inboard rim 24. The tire 18 of the inboard wheel 14 may then be removed from the inboard rim 24 by moving it outward, over the outboard rim 26. The speed and ease of servicing or replacing the inboard tire 18 may therefore be increased.

Figures 8, 9:
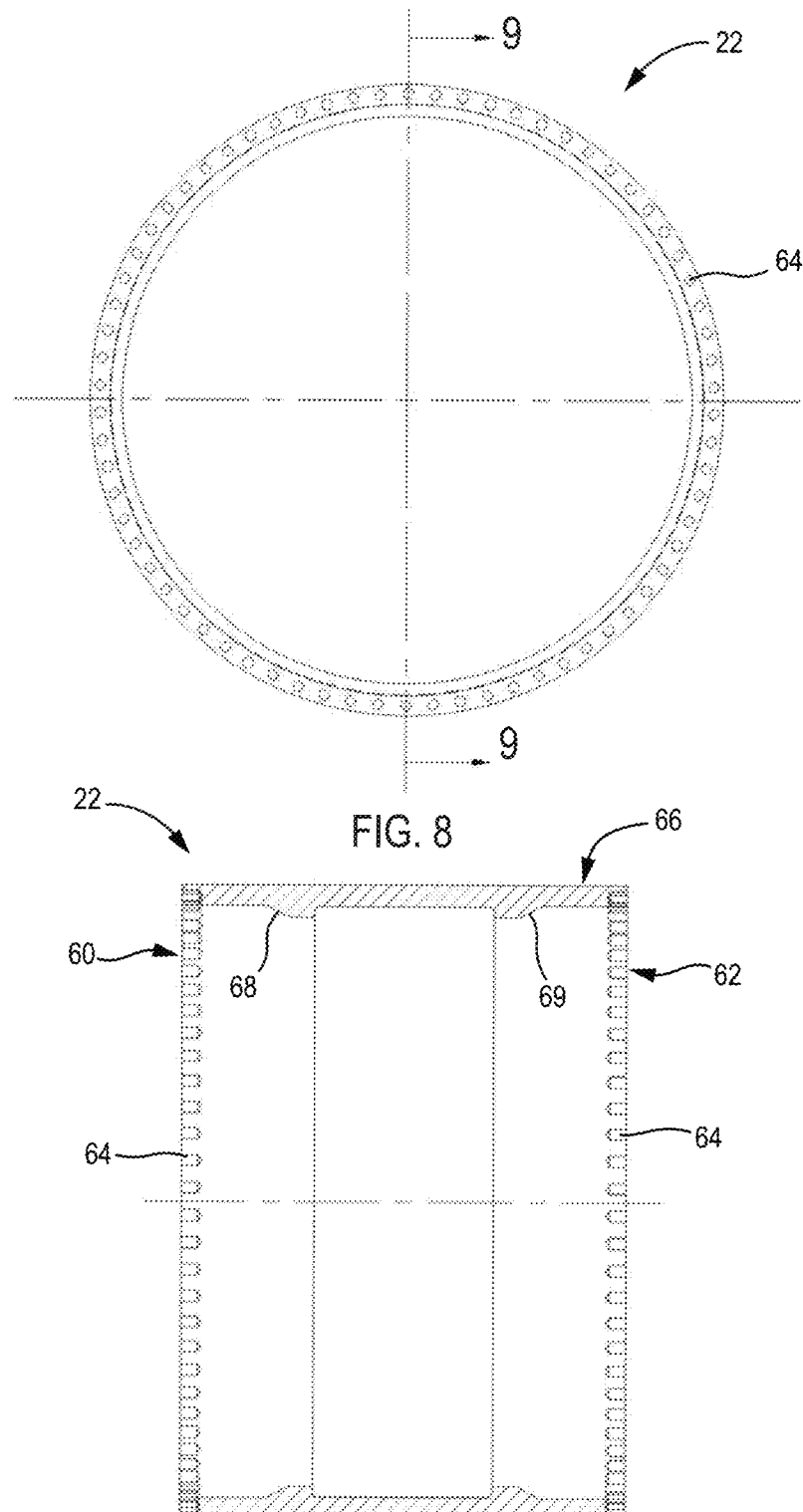
FIG. 8 is a side view of an adapter for the dual wheel adapter of FIG. 2.
FIG. 9 is a cross-section view of the adapter of FIG. 9, taken along line 10-10.

Referring to FIGS. 8 and 9, the adapter 22 is a hollow cylindrical body with an inboard annular end face 60 and an outboard annular end face 62. The end faces 60 and 62 include threaded holes 64 arranged about the circumference of the adapter 22. The inner surface of the adapter 22 is sized to receive the hub 12 and includes a first angled contact surface 68 and a second angled contact surface 69.

Figure 10:
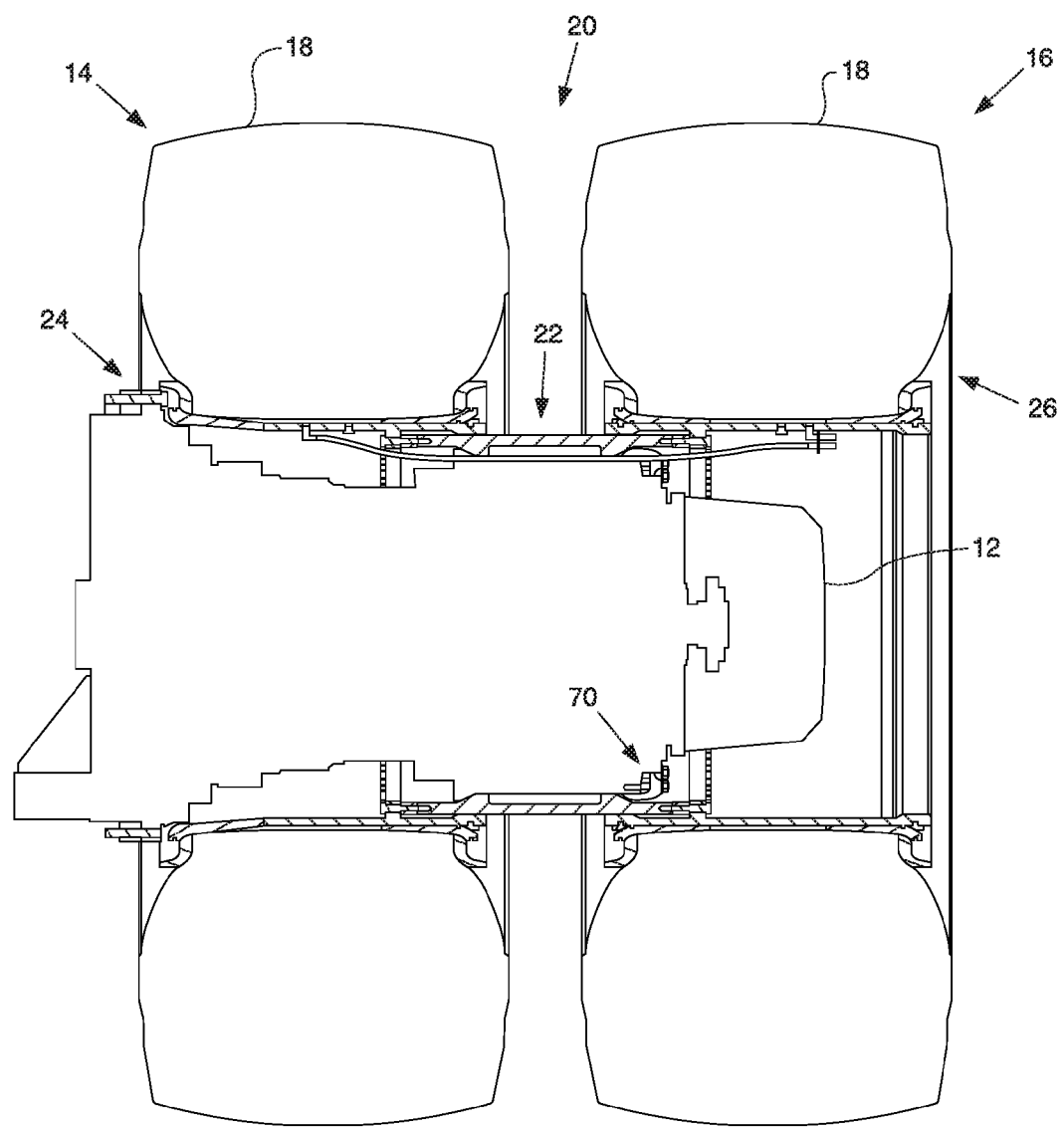
FIG. 10 is a cross-section view of the rear dual wheel adapter for the vehicle of FIG. 2, in accordance with an exemplary embodiment.
Figure 11:
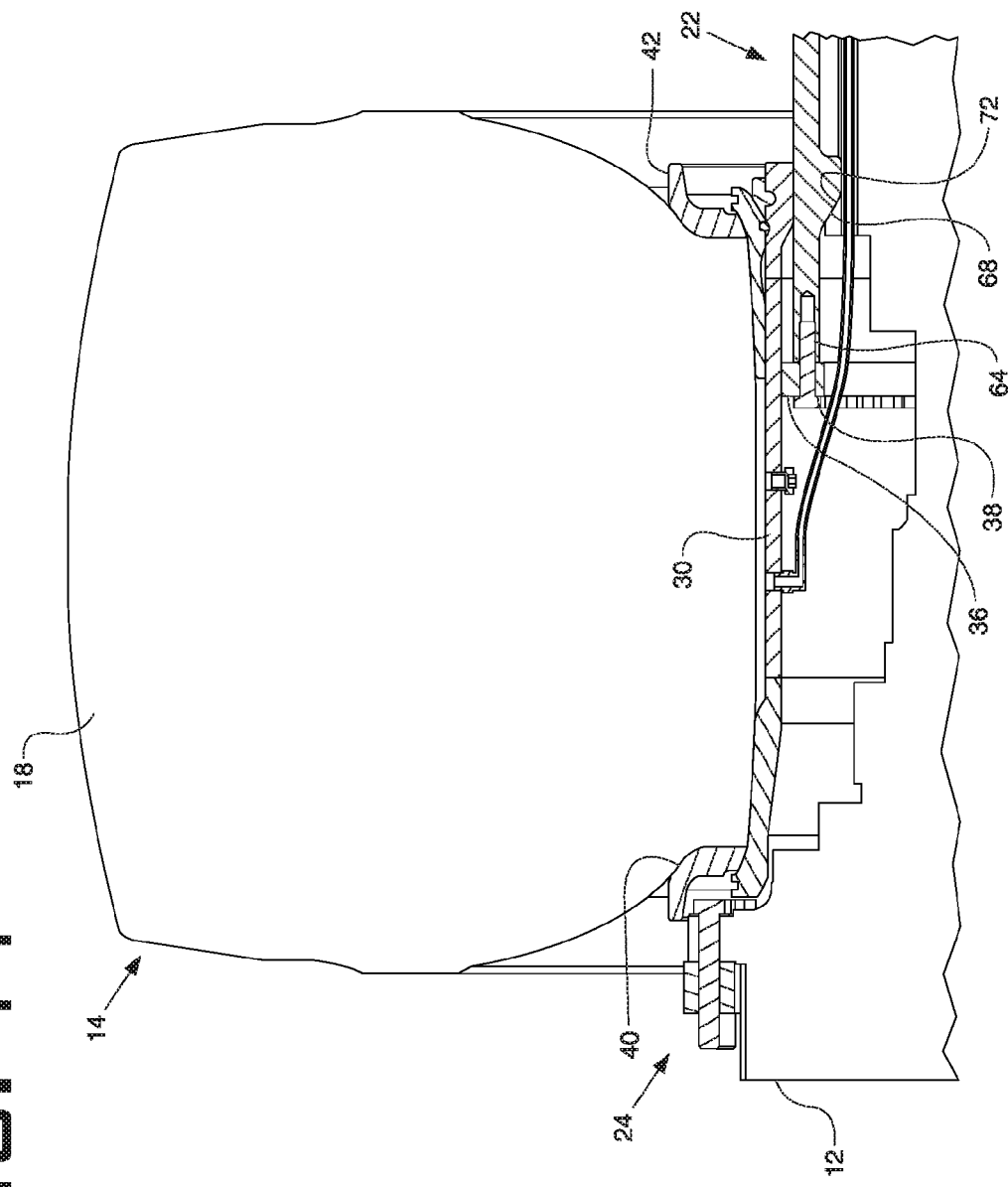
FIG. 11 is a more detailed view of a portion of the cross-section view of a rear dual wheel adapter shown in FIG. 10, in accordance with an exemplary embodiment.
Figure 12:
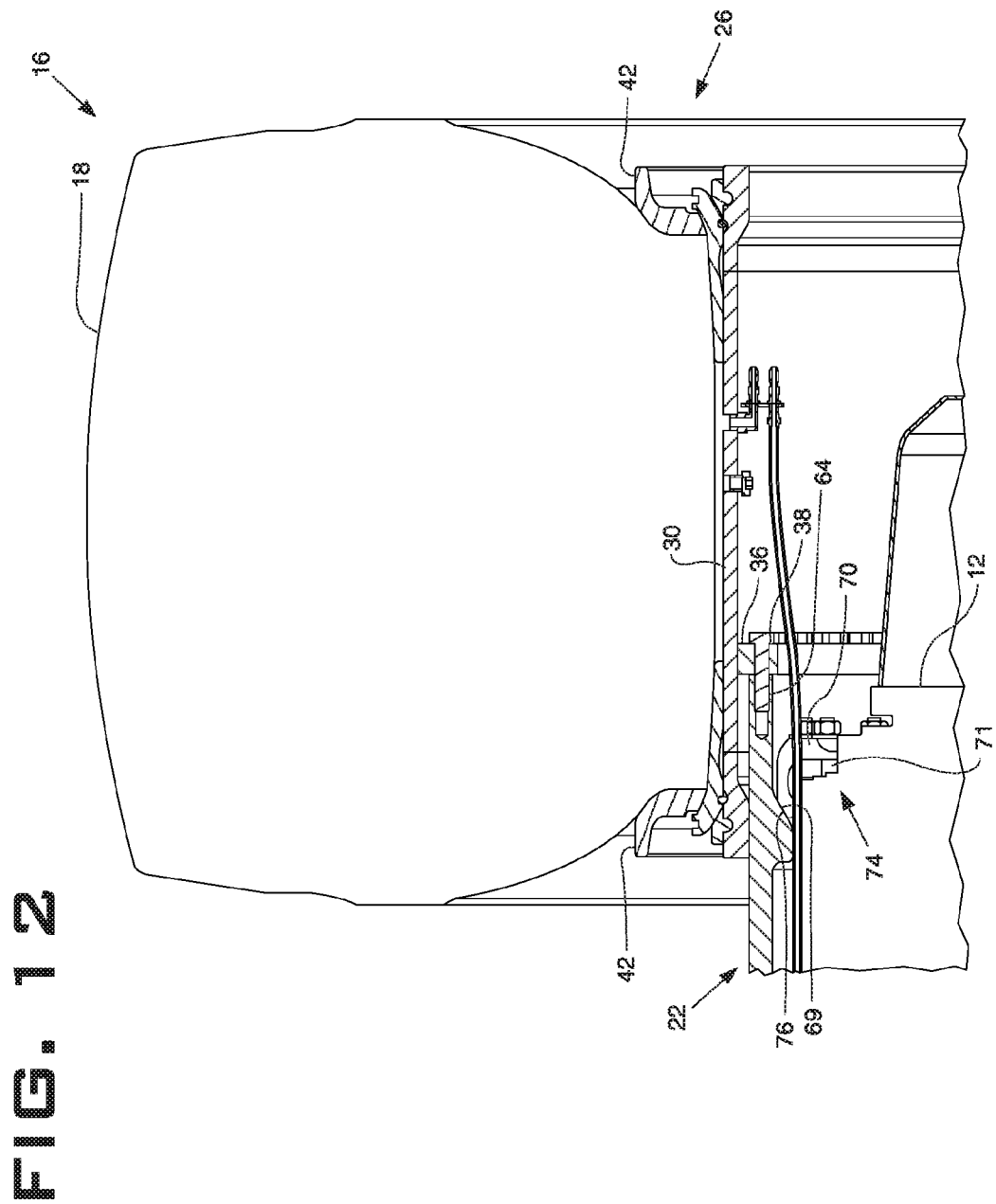
FIG. 12 is a more detailed view of another portion of the cross-section view of a rear dual wheel adapter shown in FIG. 10, in accordance with an exemplary embodiment.

Referring now to FIGS. 10-12, the adapter assembly 20 is shown according to an exemplary embodiment coupled to a hub 12. The adapter 22 couples the inboard rim 24 and the outboard rim 26 to the hub 12 such that rotation of the hub 12 may be translated to the inboard wheel 14 and the outboard wheel 16. The bolt flanges 36 of the inboard rim 24 and the outboard rim 26 abut the annular faces 60 and 62, and are coupled to the adapter 22 with bolts passing through the apertures 38 in the bolt flanges 36 and threadibly engaging the threaded holes 64 in the faces 60 and 62. The adapter 22 provides a robust assembly 20 that can be easily installed as a unit on the wheel hub 12. Once installed on the wheel hub 12, the assembly 20 permits both tires to be removed and reinstalled without disconnecting the adapter 22 from the hub 12. Although the rims 24 and 26 have been shown by way of example to be removably mountable on the adaptor, according to alternative embodiments, one or both of the rims may be integral to the adaptor. For example, the one or both rims could be welded to the adaptor (or otherwise permanently attached), or could be integrally formed with the adapter as a single unit. All such variations are intended to be within the scope of this disclosure.

The adapter 22 is shown coupled to the hub 12 with one or more wedge clamps 70. The wedge clamp 70 may be a single ring-like member or may be a multitude of individual members arranged about the periphery of the adapter 22. As shown in FIG. 12, the wedge clamp 70 includes openings (e.g., through-holes) that receive bolts 71. The hub 12 is received in the central opening of the adapter 22 with an angled shoulder 72 abutting the first contact surface 68 (see FIG. 11). The one or more wedge clamps 70 are then coupled to the hub 12 by engaging threaded openings in a shoulder 74 with the bolts 71 passing through each wedge clamp 70. By tightening the wedge clamp bolts 71, the wedge clamp 70 is drawn inward, bringing an angled face 76 of the wedge clamp 70 into contact with the second contact surface 69 of the adapter 22 (see FIG. 12). The first contact surface 68 is then forced against the angled shoulder 72 of the hub 12, compressing the adapter 22 between the wedge clamp 70 and the hub 12 to couple the adapter 22 to the hub 12.

According to any exemplary embodiment, the adapter assembly 20 is capable of fitting a larger diameter tire 18 to a hub 12 for a vehicle 10 sized for a smaller tire mounted with a conventional dual wheel rim system. The range of diameters of tires that may potentially be fitted to the hub 12 is therefore increased. The increased adaptability may increase the productivity of the vehicle 10 by reducing downtime (e.g., due to tire unavailability, etc.).

Further, the cylindrical adapter 22 extends beyond the contact surfaces 68 and 69 at which the adapter 22 interfaces with the hub 12 and the wedge clamps 70. Because the inboard rim 24 and the outboard rim 26 are each coupled to the adapter 22 via the bolt flanges 36, the bending moment experienced by a conventional dual wheel system or a stilted rim dual wheel system at the wedge clamp interface is significantly reduced or eliminated. The adapter assembly 20 therefore reduces the loading on the wedge clamps 70 compared to a stilted rim design and increases the integrity of the coupling of the inboard wheel 14 and the outboard wheel 16 to the hub 12.

The adapter assembly 20 may be provided as an aftermarket kit to allow for larger diameter tires to be fitted to a smaller diameter hub on an existing vehicle. The adapter 22 may be provided separately or may be provided in a package with the inboard rim 24 and the outboard rim 26. Tires 18 of different diameters may be coupled to the hub 12 with the adapter 22 by providing inboard rims 24 and outboard rims 26 configured to fit the tires 18 and be coupled to the adapter 22.

While the adapter assembly 20 is shown and described as being utilized on a rear wheel hubs of a vehicle, in other embodiments, a similar adapter assembly may be utilized on the front wheel hubs of a vehicle (e.g., a front wheel drive vehicle, an all-wheel drive vehicle, a front wheel assist vehicle, etc.).

The construction and arrangement of the elements of the wheel adapter as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. Some like components have been described in the present disclosure using the same reference numerals in different figures. This should not be construed as an implication that these components are identical in all embodiments; various modifications may be made in various different embodiments. It should be noted that the elements and/or assemblies of the enclosure may be constructed from any of a wide variety of materials that provide sufficient strength or durability, in any of a wide variety of colors, textures, and combinations.

INDUSTRIAL APPLICABILITY

The disclosed dual wheel adapter assembly may be utilized in any mobile equipment utilizing dual wheel assemblies, including large mining vehicles such as heavy duty mining trucks. The disclosed dual wheel adapter assembly is intended to provide a means for refitting these large vehicles with larger diameter tires. By providing the ability to fit larger diameter tires, the vehicles may be able to continue in productive service rather than sitting idle.

The disclosed dual wheel adapter is further intended to eliminate the use of stilted rims in large mining vehicles. The use of stilted rims results in an increased loading on the studs coupling the rims to the hub and an increased applied moment on the rim. The applied moment may be excessive depending on loading of the vehicle and intended use. The disclosed dual wheel adapter is intended to enable larger diameter tires to fit smaller diameter hubs without the use of stilted rims, reducing the applied moment on the rims.

It will be apparent to those skilled in the art that various modifications and variations can be made to the disclosed dual wheel adapter assembly. Other embodiments will be apparent to those skilled in the art from consideration of the specification and practice of the disclosed dual wheel adapter assembly. It is intended that the specification and examples be considered as exemplary only, with a true scope being indicated by the following claims and their equivalents.

What is claimed is:

1. A dual wheel adapter assembly for mounting dual wheel rims to a wheel hub, comprising:
   a hollow cylindrical adapter, comprising:
      a central bore defined by an inner surface of the adapter;

a first contact surface; and a second contact surface;

an inboard wheel rim configured to support a tire, the inboard wheel rim coupled to the adapter;

an outboard wheel rim configured to support a tire, the outboard wheel rim coupled to the adapter; and a wedge clamp configured to be coupled to the hub;

wherein the first contact surface abuts the hub and the wedge clamp applies a compressive force to the second contact surface to couple the adapter to the hub, wherein the adapter further comprises a first annular end face and a second annular end face, the inboard wheel rim being coupled to the first annular end face and the outboard wheel rim being coupled to the second annular end face, and wherein the first annular end face is inboard from the first contact surface and the second annular end face is outboard from the second contact surface.

2. The dual wheel adapter assembly of claim 1, wherein the inboard wheel rim comprises at least one removable flange configured to support the sidewall of the tire.

3. The dual wheel adapter assembly of claim 2, wherein the outboard wheel rim comprises at least one removable flange configured to support the sidewall of the tire.

4. The dual wheel adapter assembly of claim 3, wherein removal of the removable flanges allows the tire to be removed from the inboard wheel rim with the adapter remaining coupled to the hub.

5. The dual wheel adapter of claim 1, wherein at least one of the inboard wheel rim and the outboard wheel rim are (a) removably coupled to the adapter with bolts or (b) integral to the adaptor.

6. A dual wheel adapter for mounting dual wheel rims to a wheel hub, comprising:

a hollow cylindrical adapter, comprising:

a central bore defined by an inner surface of the adapter;

a first angled contact surface configured to engage the wheel hub;

a second angled contact surface configured to engage a clamp;

a first annular end face and a second annular end face, the first annular end face configured to connect to an inboard wheel rim and the second annular end face configured to connect to an outboard wheel rim, wherein the first annular end face is inboard from the first angled contact surface and the second annular end face is outboard from the second angled contact surface.

7. The dual wheel adapter of claim 6, wherein the end faces include threaded holes arranged about the circumference of the adapter, the threaded holes configured to receive fasteners for coupling the inboard wheel rim and outboard wheel rim to the dual wheel adapter.

8. The dual wheel adapter of claim 6, wherein the dual wheel adapter is configured to engage wedge clamps.

9. The dual wheel adapter of claim 6, wherein the end faces are configured to connect to the wheel rims via bolt flanges.

* * * * *